Figure 6:
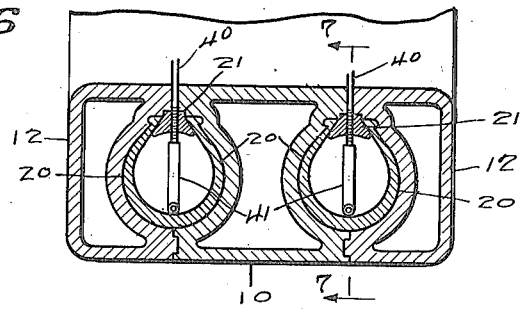

C. E. MILLER.
VULCANIZER FOR RUBBER TIRES.
APPLICATION FILED DEC. 26, 1916.
1,234,065.
Patented July 17, 1917.
3 SHEETS—SHEET 1.
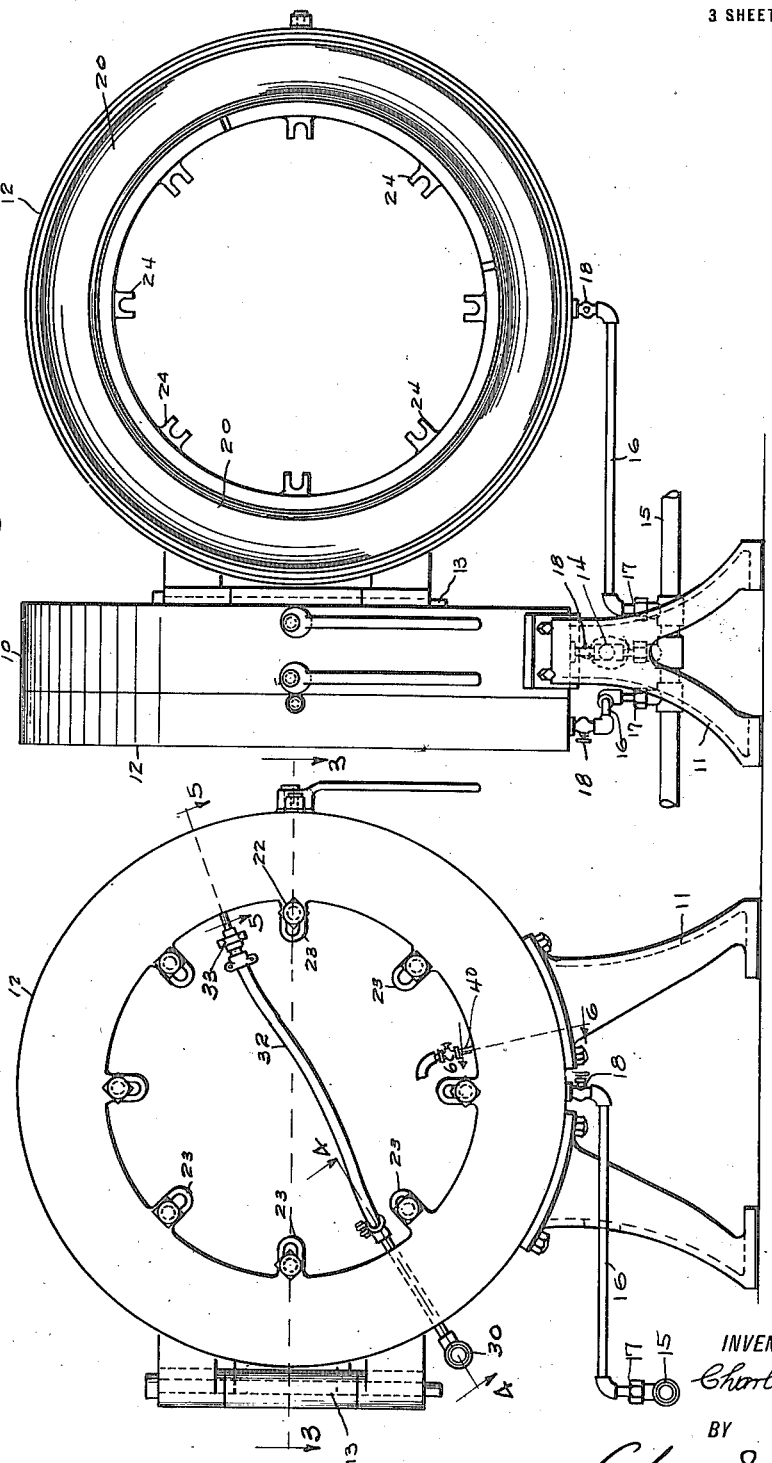
INVENTOR
Charles E. Miller
BY
Lockwood & Lockwood
ATTORNEYS

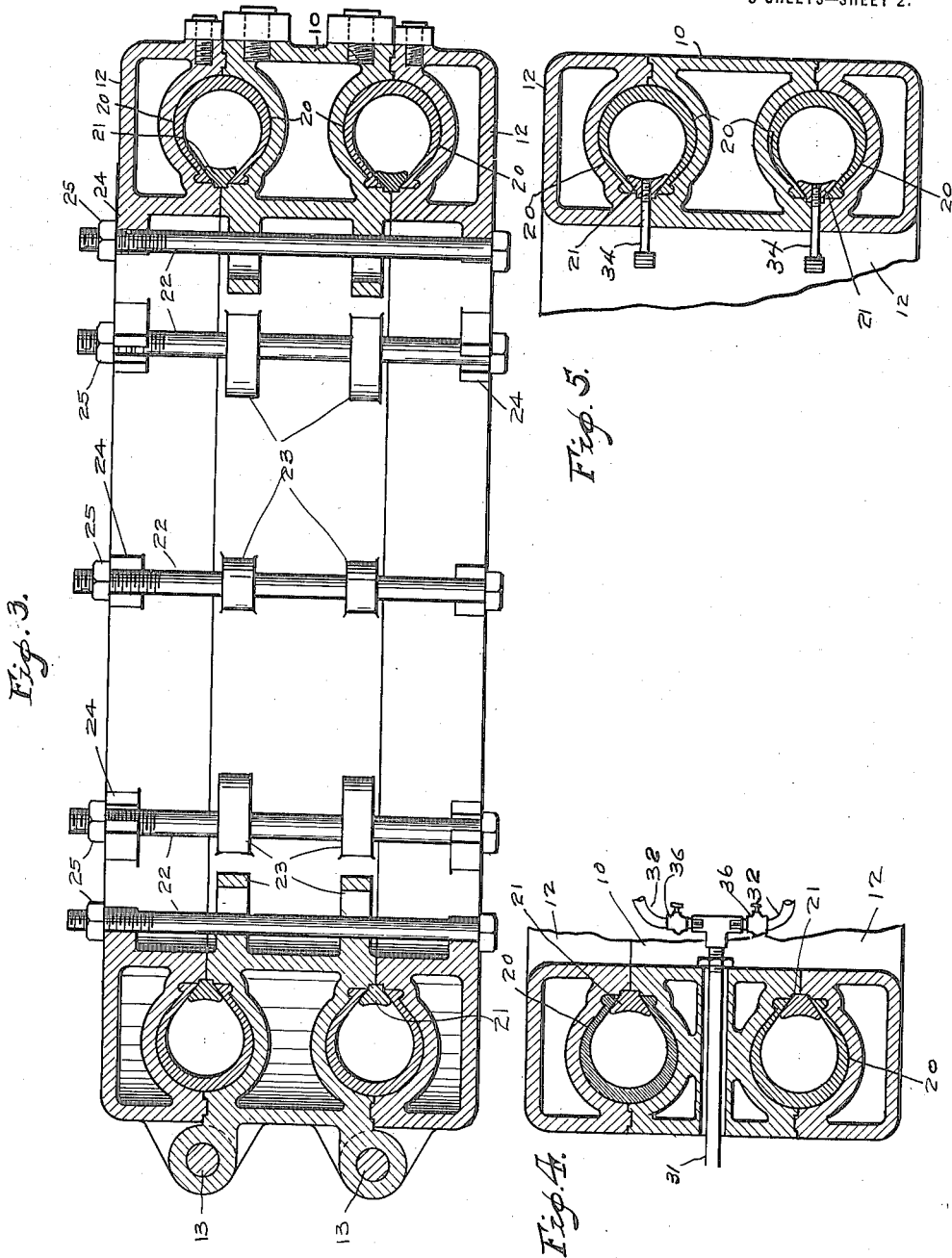

C. E. MILLER.
VULCANIZER FOR RUBBER TIRES.
APPLICATION FILED DEC. 26, 1916.

1,234,065.

Patented July 17, 1917.
3 SHEETS—SHEET 3.

INVENTOR
Charles E. Miller

BY
Lockwood Lockwood
ATTORNEYS

UNITED STATES PATENT OFFICE.

CHARLES E. MILLER, OF ANDERSON, INDIANA.

VULCANIZER FOR RUBBER TIRES.

1,234,065.  Specification of Letters Patent.  Patented July 17, 1917.

Application filed December 26, 1916. Serial No. 138,872.

*To all whom it may concern:*

Be it known that I, CHARLES E. MILLER, a citizen of the United States, and a resident of Anderson, county of Madison, and State of Indiana, have invented a certain new and useful Vulcanizer for Rubber Tires; and I do hereby declare that the following is a full, clear, and exact description thereof, reference being had to the accompanying drawings, in which like letters refer to like parts.

The object of this invention is to promote the simple, economic and efficient vulcanization of rubber tires and the like. With the means and method heretofore generally employed by the manufacturers of rubber tires, the tires have been wound and formed on cores and several tires on the cores placed within a vulcanizing chamber. To keep the men busy, each man must have about twelve cores. They are heavy and hard to transport from the place of forming the tire to the place of vulcanizing the tire. The vulcanizer must be cooled after vulcanizing before the tires can be moved or handled and then when a new set of tires are put in the vulcanizer, the same must be reheated and much of the heat is lost during the cooling and heating parts of the process.

In the invention herein shown and described one core for each man is all that is necessary. The device is always heated and is never cool and as soon as a tire is removed from the vulcanizer, another tire can be put in to be vulcanized, and the operation of the vulcanizer be, therefore, continuous, and one tire or more can be heated, as desired. Only a small boiler is necessary and a relatively small amount of steam, and the vulcanizer is relatively small and light and cheap in cost.

One feature of the invention consists in providing a stationary steam chamber with a half tire recess on each side thereof and having hinged to each side thereof another steam chamber with a corresponding half tire recess in it, whereby the tire can be placed in the recesses of said stationary and hinged steam chambers, and when the hinged portion is closed, the tire can be vulcanized. The tire can be removed by opening the hinged member. With a small device, two tires can be simultaneously vulcanized, one on each side of the stationary member.

Another feature of the invention consists in providing means for supplying steam to the stationary member and also to the hinged members without interfering with the opening and closing of said hinged members, and if desired, steam can be constantly in communication with the hinged members while open as well as closed. After the tire is placed in a vulcanizer, steam or air under pressure is introduced into the interior of the tire, the tire having been lifted from the core by the workman for forming the next tire.

Therefore, in this invention the external surface of the tire is inclosed by the fixed and unchangeable inner surface of the molds or members of the vulcanizer and the tire is pressed from the interior outwardly against said surfaces so that the external surface of the tire will be perfectly formed. In the method heretofore generally employed, the tire has been vulcanized on an iron core with the unchangeable form and surface on the interior of the tire so that all of the irregularities of the tire would be external. This would make a smooth interior surface but a rough exterior surface. This trouble is overcome by the invention herein set forth. Furthermore, by introducing steam or pressure directly into the tire, it is cured from both the inside out, and outside in. Such former method caused contraction, relatively speaking, of the parts of the tire, often wrinkling the fabric and such wrinkling has been one of the most common and serious defects of tires. In this invention, the external surface being held fixed by the vulcanizer and the interior of the tire being under pressure outward, the tendency is to enlarge or expand fabric and, therefore, to remove rather than cause wrinkles therein and consequently to improve materially the texture and quality of the tire when vulcanized.

Another feature of the invention consists in placing an annular ring in the tire to hold the beads thereof in place and to properly form them, and such a ring is utilized for introducing through it a steam or air pipe for conveying steam or air under pressure in the tire.

Still another feature of the invention consists of means for permitting water formed from condensation to be forced out of the tire, which means consists of an open tube extending to the lowest level of the inner surface of the tire through which the condensed steam or vapor will be forced by the pressure exerted therein.

If it is desired to vulcanize inner tubes or bicycle tires, the annular ring is not used and the pressure is introduced into the tire or tube through the air valve. Otherwise, the operation is the same. It will, therefore, be noted from the above that there is approximately an eighty per cent. saving of fuel, due to the fact that the vulcanizer is kept heated and not permitted to cool and also from its construction, and a fifty per cent. saving of time will result from these improvements.

Figure 7:
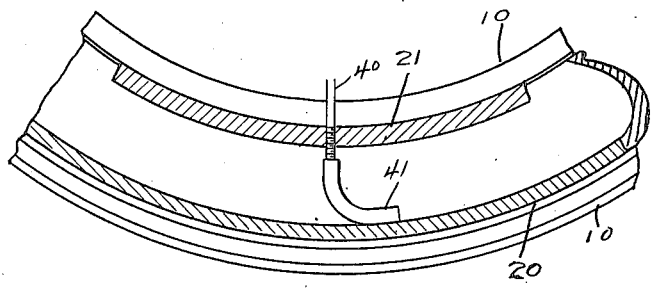

The full nature of the invention will be understood from the accompanying drawings and the following description and claims:

In the drawings, Figure 1 is a side elevation of the vulcanizer. Fig. 2 is a front elevation thereof with one side member swung open. Fig. 3 is a horizontal section through the vulcanizer on the line 3—3 of Fig. 1. Fig. 4 is a cross section on the line 4—4 of Fig. 1. Fig. 5 is a cross section on the line 5—5 of Fig. 1. Fig. 6 is a cross section on the line 6—6 of Fig. 1. Fig. 7 is a cross section on the line 7—7 of Fig. 6.

There is shown in the drawings a stationary hollow vulcanizing member 10 mounted upon a base 11 which rests on the floor. To each side of said stationary vulcanizing member there is a hinged vulcanizing member 12, hinged thereto by hinges 13 at the rear, as shown in Fig. 1, so that the hinged members can be swung laterally open or shut. Each vulcanizing member 10 and 12 is hollow and forms a steam chamber. Steam is introduced into the stationary vulcanizing chamber through a steam pipe 14 which leads from a supply pipe 15. Steam is supplied to the hinged vulcanizing members through a pipe 16 which at one end is secured to the hinged member and at the other end is secured to a pipe 17 extending up from the supply pipe 15 and in vertical alinement with the hinge 13 above and so that the pipe 16 will turn on the pipe 17 when the hinged member 12 is moved open or shut. Hence, steam can enter any of those members at any time and each is provided with a shut-off valve 18.

The adjacent walls of the members 10 and 12 of the vulcanizer have annular recesses 20, each semi-circular in cross section, and arranged so that said recesses will register with each other when the vulcanizing members are closed, for receiving and holding the tire while being vulcanized. After the tire has been formed by the workman on a core, not shown, it is removed from the core and carried to the vulcanizer. Then the mold ring 21 is placed within the tire and the tire and ring placed within the recess in the stationary vulcanizing member 10, and the hinged member 20 closed and locked tightly shut and held by the bolts 22 which are secured in the ears 23 in the inner periphery of the stationary member 10 of the vulcanizer, as shown in Fig. 3, and project through the ears 24 on the inner periphery of the hinged member 12 of the vulcanizer. When the nuts 25 are tightened on the bolts 22, the hinged vulcanizing member will be tightly secured to the stationary member 10 and will remain so during the vulcanizing.

The annular mold ring 21 is substantially V-shaped in cross section and engages and separates and holds in place in the vulcanizer, the free edges and beaded portions of the tire, as shown in Fig. 3. Steam is supplied to the interior of the tire through a pipe 30 and tube 31 which extends through the vulcanizer and is connected by a double joint to the tubes 32. The tubes 32 extend to and are secured by releasable unions 33 to pipes 34 adapted to extend through the ring 21. The pipes 34 are provided with valves 36, so that when the members are swung open, the valves are closed and the unions 33 are disconnected.

After two tires are placed in the vulcanizer, the steam is turned on through the various pipes, whereby the vulcanizing members 10 and 12 are heated and transmit heat inwardly to the tire, and steam is directly introduced into the tire for quickly and effectively heating the same and to maintain the interior thereof under strong pressure, say sixty-five pounds to the square inch. This will very effectively vulcanize the tire from both the inside and outside, force and expand the fabric therein outward and thus prevent or smooth out wrinkles and make a well vulcanized durable tire with a perfect external surface.

To remove the tire, after it is vulcanized, the nuts 25 are taken off the bolts 22 and the union 33 separated, whereupon the side members 12 are opened, the tire taken out of the vulcanizer and the mold ring 21 taken out of the tire.

In order that the condensation may be removed from the inside of the tire, a pipe 40 is provided which extends through the annular ring 21 and has a curved tube 41 on the inner end thereof, which is adapted to curve slightly so as to lie flat on the lowest level of the inner surface of the tire so that the pressure exerted therein will force the moisture and water to escape through the tube and pipe.

In order to prevent air leakage through the fabric and rubber during the process of vulcanization, the inner surface is painted with a preparation which fills the air spaces and makes the tire air tight and also acts as a lubricant after the tire is vulcanized, for the inner tire, so as to lessen the friction between the inner tube and the fabric of the tire.

The vulcanizer does not have to be cooled while the tire is being removed therefrom and another tire can be immediately placed in the vulcanizer while it is still hot and the side members closed and the vulcanization thereof proceeded with at once and before the mold ring is removed from the previously vulcanized tire. For this purpose a plurality of mold rings are employed.

The invention is not limited to employment of steam within the tire as other fluid under pressure may be introduced therein or the well known air bag employed therefor.

The invention claimed is:

1. A vulcanizer for rubber tires including a stationary hollow vulcanizing member with the side thereof provided with an annular recess to receive a tire, another hollow vulcanizing member hinged to the stationary member and adapted to be swung against and secured to a side of the stationary member and having in the face thereof adjacent the stationary member an annular recess registering with the annular recess in the stationary member for coöperating therewith in receiving and holding the tire while being vulcanized, an annular ring insertible in the tire and adapted to fit between adjacent free edges thereof, and means for heating said vulcanizing members.

2. A vulcanizer for rubber tires including a stationary hollow vulcanizing member with the side thereof provided with an annular recess to receive a tire, another hollow vulcanizing member hinged to the stationary member and adapted to be swung against and secured to a side of the stationary member and having in the face thereof adjacent the stationary member an annular recess registering with the annular recess in the stationary member for coöperating therewith in receiving and holding the tire while being vulcanized, an annular ring insertible in the tire and adapted to fit between adjacent free edges thereof, and a pipe secured to said annular ring for introducing liquid under pressure into said tire.

3. A vulcanizer for rubber tires including a stationary hollow vulcanizing member with the side thereof provided with an annular recess to receive a tire, another hollow vulcanizing member hinged to the stationary member and adapted to be swung against and secured to a side of the stationary member and having in the face thereof adjacent the stationary member an annular recess registering with the annular recess in the stationary member for coöperating therewith in receiving and holding the tire while being vulcanized, an annular ring insertible in the tire and adapted to fit between adjacent free edges thereof, a pipe secured to said annular ring for introducing fluid under pressure into said tire for heating the same, a stationary supply pipe, means for connecting said stationary pipe and the pipe in said annular ring, and means for removably uniting said pipes.

4. A vulcanizer for rubber tires including a stationary hollow annular vulcanizing member with the side thereof provided with an annular recess to receive a tire, another hollow annular vulcanizing member hinged to the stationary member and adapted to be swung against and secured to a side of the stationary member and having in the face thereof adjacent the stationary member an annular recess registering with the annular recess in the stationary member for coöperating therewith in receiving and holding the tire while being vulcanized, means for introducing steam into said vulcanizing members for heating the same, a plurality of slotted projections extending radially inward from the inner periphery of one of said members, bolts having nuts screwed thereon extending through said slotted projections, and U-shaped ears extending inwardly from the other member in position to register with said projections whereby the bolts may be slipped in place and said members locked in position without removing them.

5. A vulcanizer for rubber tires including a stationary hollow vulcanizing member adapted to stand vertically upright and having both sides thereof provided with annular recesses to receive tires, hollow vulcanizing members hinged to said stationary member on each side thereof adapted to swing laterally against said stationary member and be secured thereto and having in their faces adjacent the stationary member annular recesses adapted to register with the annular recesses in the stationary member for coöperating therewith and receiving and holding tires while being vulcanized, a pipe for introducing steam into the stationary member, and a plurality of pipes for introducing steam into said members, said pipes having swivel joints in alinement with the hinges connecting said members to the stationary member, whereby said steam pipes will not interfere with the opening and closing of said members so that said members may be easily swung laterally outward by hand so as to be in a position to receive tires.

In witness whereof, I have hereunto affixed my signature in the presence of the witnesses herein named.

CHAS. E. MILLER.

Witnesses:
 L. A. LA MONT,
 CHAS. L. FRANK.